United States Patent
Bentz et al.

(10) Patent No.: US 6,363,441 B1
(45) Date of Patent: Mar. 26, 2002

(54) TIMING CONTROLLER HAVING DEPENDENCY MEMORY, SELECTION SERIALIZATION COMPONENT AND REORDERING COMPONENT FOR MAINTAINING TIME DEPENDENCIES IN CONVERSIONS BETWEEN SEQUENTIAL AND PARALLEL OPERATIONS USING STAGING MEMORY

(75) Inventors: Ole Bentz, Sunnyvale; Ian O'Donnell, Berkeley, both of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/263,185

(22) Filed: Mar. 5, 1999

(51) Int. Cl.[7] .......................... G06F 3/06; G06F 13/00; G06F 13/38; G06F 5/00
(52) U.S. Cl. ................ 710/58; 710/71; 710/6; 710/29; 710/40; 710/43; 710/59; 710/244; 709/102; 709/103; 711/158; 711/167; 711/168; 711/169; 712/215; 712/216
(58) Field of Search ............... 710/5–7, 20, 25, 710/29, 35, 36, 39, 40, 41, 43, 45, 52, 58, 59, 65, 71, 112, 115–118, 122–125, 244; 709/100, 102, 103, 104, 107, 207; 711/158, 167, 168, 169; 712/200, 214–219

(56) References Cited

U.S. PATENT DOCUMENTS

| 5,260,933 | A | * | 11/1993 | Rouse | 370/216 |
| 5,630,091 | A | * | 5/1997 | Lin et al. | 711/110 |
| 5,655,096 | A | * | 8/1997 | Branigin | 712/200 |
| 5,768,530 | A | * | 6/1998 | Sandorfi | 709/233 |
| 5,806,084 | A | * | 9/1998 | Lin et al. | 711/110 |
| 6,216,178 | B1 | * | 4/2001 | Stracovsky et al. | 710/6 |

\* cited by examiner

*Primary Examiner*—Thomas Lee
*Assistant Examiner*—Tanh Q. Nguyen
(74) *Attorney, Agent, or Firm*—Wagner, Murabito & Hao LLP

(57) ABSTRACT

An electronic system and method that maintains time dependencies and ordering constraints in an electronic system. A timing controller utilizes a representative bit to track timing dependencies associated with information and ensures the information is communicated and processed in an order that preserves the timing dependencies as the information is converted from parallel to parallel or parallel to serial operations. The present invention tracks the order in which information is loaded in a electronic hardware component and ensures that the information loaded into the electronic hardware component at a particular time is processed without interruption by information loaded at a different time. For example, the timing controller tracks the order in which texel information associated with a pixels parallelly loaded in a staging memory and issues electronic signals that cause the information loaded at a particular time to sequentially empty without interruption by information parallelly loaded in the staging memory at a different time.

19 Claims, 15 Drawing Sheets

1100

|      | 1117 | 1116 | 1115 | 1114 | 1113 | 1112 | 1111 | 1110 |
|------|------|------|------|------|------|------|------|------|
| 1120 | 0    | 0    | 0    | 0    | 0    | 0    | 0    | 1    |
| 1121 | 0    | 0    | 0    | 0    | 1    | 0    | 0    | 0    |
| 1122 | 0    | 0    | 0    | 1    | 0    | 0    | 0    | 0    |
| 1123 | 0    | 1    | 0    | 0    | 0    | 0    | 0    | 1    |
| 1124 | 0    | 0    | 0    | 0    | 0    | 0    | 1    | 0    |
| 1125 | 0    | 0    | 1    | 0    | 0    | 0    | 0    | 0    |
| 1126 | 1    | 0    | 0    | 0    | 0    | 1    | 0    | 0    |
| 1127 | 1    | 0    | 0    | 0    | 0    | 0    | 0    | 0    |

Fig. 11

TIMING CONTROLLER HAVING DEPENDENCY MEMORY, SELECTION SERIALIZATION COMPONENT AND REORDERING COMPONENT FOR MAINTAINING TIME DEPENDENCIES IN CONVERSIONS BETWEEN SEQUENTIAL AND PARALLEL OPERATIONS USING STAGING MEMORY

FIELD OF INVENTION

The present invention relates to the field of time dependency maintenance in serial and parallel operations of an electronic system. More particularly, the present invention relates to a system and method for efficient utilization of electronic hardware in conversions that includes parallel operations.

BACKGROUND OF THE INVENTION

Electronic systems and circuits have made a significant contribution towards the advancement of modern society and are utilized in a number of applications to achieve advantageous results. Digital computers, calculators, audio devices, video equipment, telephone systems and a number of other electronic systems and circuits have facilitated increased productivity and reduced costs in a variety of activities, including the analysis and communication of data, ideas and trends in most areas of business, science, education and entertainment. These electronic systems and circuits are usually arranged in a variety of complicated configurations governed by processing and communication limitations, including time dependencies and ordering constraints. For example, some systems rely on sequential processing or communications (e.g., first in first out (FIFO)) and some systems rely on parallel processing or communications. Sequential processing and communication systems are typically cheaper and easier to design and build than parallel processing and communication systems. Parallel processing and communication systems are usually faster than sequential processing and communication systems. Electronic system design decisions are affected by these and other comparative attributes of different processing and communication architectures.

For most electrical systems to operate properly it is usually critical to maintain timing dependencies and follow ordering constraints. For example, in a parallel process or communication system it is usually important for information associated with a particular period in time be forwarded to certain key points at the same time. If the information is not forwarded together at the appropriate time a parallel process will not remain "parallel" and will not operate correctly. In sequential processing and communication systems information is usually divided into units that are transmitted or processed one piece at a time with one piece of information following another. In some situations it is critical for one piece of information to follow another particular piece of information and if the appropriate order is not maintained the system will not operate properly.

Computer systems are an example of electronic systems that often rely on sequential or parallel processing and communications. A partial list of areas impacted by these applications include the generation of special effects for movies, realistic computer-generated three-dimensional graphic images and animation, real-time simulations, video teleconferencing, Internet-related applications, computer games, telecommuting, virtual reality, high-speed databases, real-time interactive simulations, medical diagnostic imaging, word processing, spread sheets etc. FIG. 1 shows a schematic of a typical prior art computer graphics system 100. Computer graphics system 100 comprises a central processing unit (CPU) 101, a main memory 102, graphics system 103, mass storage device 105, keyboard controller 106, keyboard 108, printer 109 and display monitor 110, all of which are coupled to bus 107. CPU 101 handles most of the control and data processing. In one embodiment CPU 101 operates in a sequential manner and in another embodiment CPU 101 comprises multiple processing components that operate in parallel. Main memory 102 provides a convenient method of storing data for quick retrieval by CPU 101. Graphics system 103 processes image data in pipelined stages including pixel information. Mass storage device 105 stores data associated with multiple images and applications. Keyboard controller 106 controls keyboard 108, which operates as an input device. Printer 109 prints hard copies of graphical images and display monitor 110 displays graphical images.

Computer systems typically have some method of interfacing with users. Often, this interfacing involves the graphical representation of images (graphics) on a display screen, other visualization device or a hard copy printout. Typically, these images are generated by computer graphics systems that simulate and display images of real or abstract objects. In most computer graphic systems an image is represented as a raster (an array) of logical picture elements (pixels). A pixel is usually a rectangle, but can be other shapes. The computer graphics system utilizes a rasterization process to assign parameter values to each pixel. These parameter values are digital values corresponding to certain attributes of the image (e.g. color, depth, etc.) measured over a small area of the image represented by a pixel. Typically each graphical image is represented by thousands of combined pixels.

In a complex or three dimensional (3D) computer generated graphical image, objects are typically described by graphics data models that define the shape of the object, the object's attributes, and where the object is positioned. As details become finer and more intricate it is often advantageous to map an image onto a surface. Mapping an image onto a surface is usually accomplished through texture mapping in which an image is defined by a texture map comprising individual texture elements referred to as texels. In texture mapping procedures a texel is utilized to substitute or scale a surface property (e.g., diffuse color components, shading characteristics, dithering, etc.) at each pixel. Various trade-offs can be made in the selection or computation of a texel, trading off quality of results with computational complexity. For high quality results, bilinear interpolation between adjacent texels can be utilized, in which case up to 4 texels are required (i.e. a 2×2 region of the texture image). For even higher quality results a technique called "mipmapping" can be used (along with trilinear interpolation) in which a 2×2 region of texels is required from each of two adjacent levels of detail (LOD) (e.g., copies of a texture image reduced in size by $2^N$ (for N=1,2, . . . )).

FIG. 2 is a conceptual example of a texture image configuration system 200. Texture image configuration system 200 includes 2 by 2 texel regions, such as texel region 291, set in 16 by 16 region tiles 270 through 285 arranged on an "x axis" 210, "y axis" 220 and "z axis" 230 coordinate system. The 2 by 2 texel regions can be arranged in any place within the texture images and can slide around, sometimes it may fall in a single tile, sometimes it may fall within two tiles and other times it may fall within four tiles. "Slices" of a 3D image are defined by the "z axis", for example texel region 291 is in slice 233 and texel region 292 is in slice 234.

In one example of a graphics system architecture a processor processes texel information retrieved from a cache memory component. The texture information is downloaded from a periphery memory component to the cache memory component in blocks of bits that define the texture information included in a particular tile. Usually an image is composed of numerous pixels and each pixel is modified by many texels represented by several bits. Thus a large amount of information or data needs to be processed and communicated in a typical computer graphics system. Electronic system design decisions on how to optimize the processing and communication of this information is usually affected by time dependencies and ordering constraints.

Thus, there is a great need for an architecture that provides time dependency and ordering constraint management in a reliable, cost effective, and extremely efficient manner. The architecture should be adaptable to a wide variety of electronic systems and have the ability to satisfy data processing and communication limitations of diverse components, including time dependency requirements and ordering constraints. For example, the architecture should facilitate utilization of parallel and sequential graphics processing and communication hardware in an effective and efficient manner to support retrieval of information for a cache memory.

SUMMARY OF THE INVENTION

The system and method of the present invention provides time dependency and ordering constraint management in a reliable, cost effective, and extremely efficient manner. The present invention is adaptable to a wide variety of electronic systems and has the ability to satisfy the data processing and communication requirements of diverse components, including time dependency requirements and ordering constraints. In one embodiment the system and method of the present invention ensures that the order of departing data substantially follows the order of arriving data while allowing efficient sharing and utilization of available hardware. For example, the present invention facilitates utilization of parallel and sequential graphics processing and communication hardware in an effective and efficient manner to support retrieval of information for a cache memory.

In one embodiment of the present invention, an electronic system and method maintains time dependencies associated with conversion of information between serial and parallel operations. A timing controller utilizes a tracking label (e.g., a representative bit) to track timing dependencies associated with the information and ensures the information is communicated and processed in an order that preserves the timing dependencies. The present invention tracks the order in which information is loaded in an electronic hardware component and ensures that the information loaded into the electronic hardware component at a particular time is processed without interruption by information loaded at a different time. For example, the timing controller tracks the order in which texel information associated with a pixel is parallelly loaded in a staging memory and causes the information loaded at a particular time to sequentially empty without interruption by information parallelly loaded in the staging memory at a different time.

BRIEF DESCRIPTION OF THE DRAWINGS

FIG. 11 is a matrix table showing one example of the bits parallelly loaded in a dependency memory of the present invention after going through a reorder component.

DETAILED DESCRIPTION OF THE INVENTION

Figure 1:
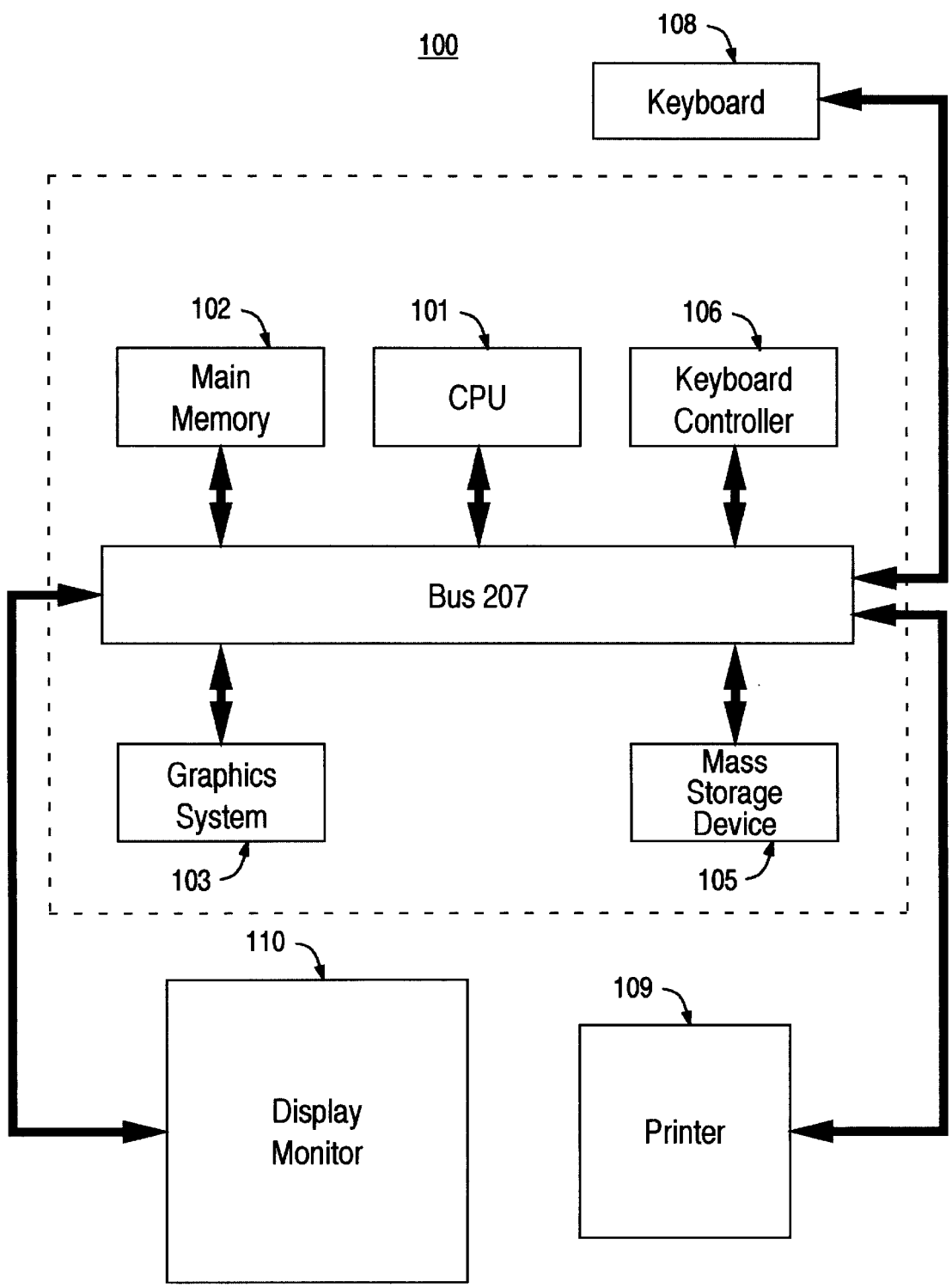
FIG. 1 shows schematic of a typical prior art computer graphics system.
Figure 2:
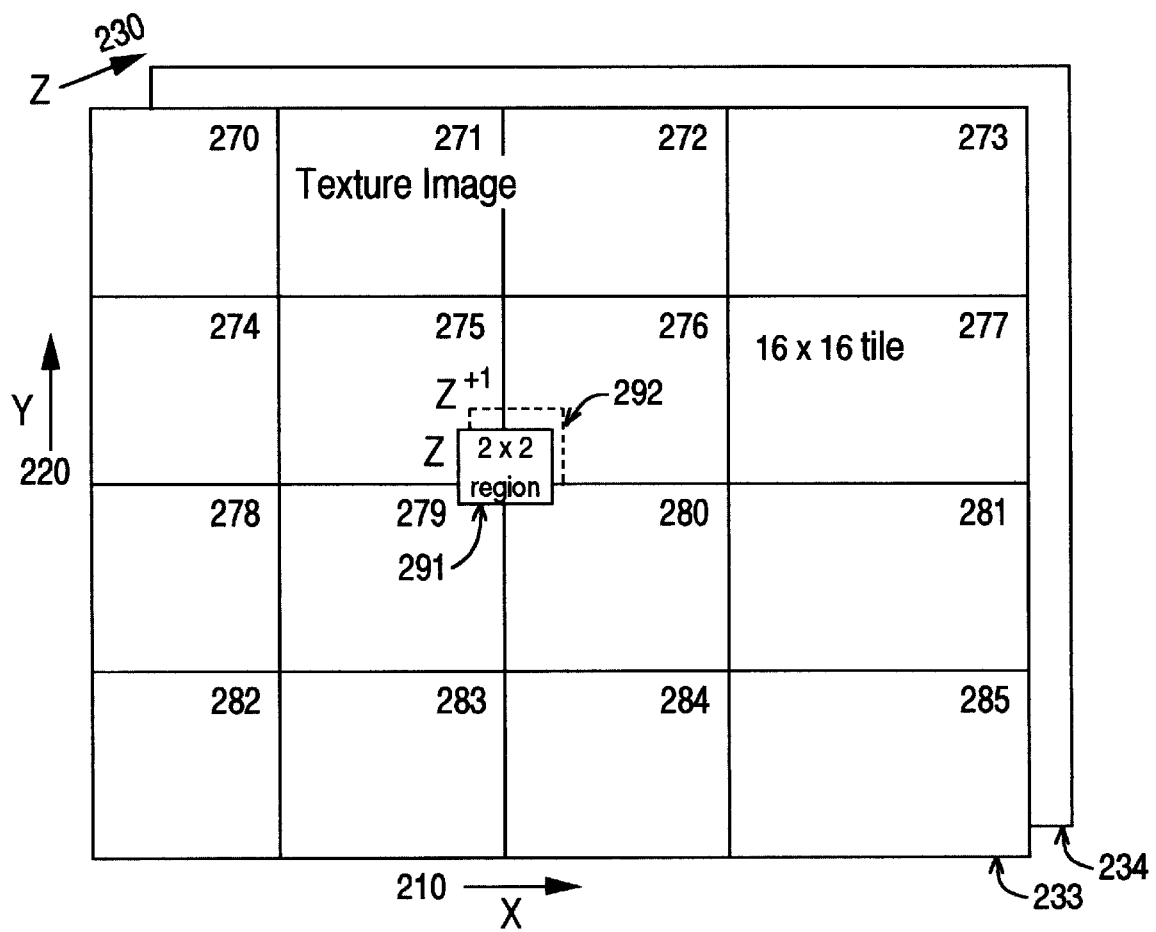
FIG. 2 is a conceptual example of a prior art texture image configuration system.

Reference will now be made in detail to the preferred embodiments of the invention, a system and method for maintaining time dependencies, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system or other electronic system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or other electronic device, that manipulates and transforms data represented as physical (electronic) quantities within the system's components (e.g., registers and memories) into other data similarly represented as physical quantities within the system's components including information storage, transmission or display devices.

The system and method of the present invention tracks time dependencies and ensures that information is communicated and processed in an appropriate order. The time dependency maintenance system and method of the present invention improves utilization of hardware resources and increases overall system performance in combined sequential and parallel systems. In one embodiment of the present invention, information is entered in a staging component in parallel and unloaded in a sequential manner that ensures information parallelly loaded into the staging component at a particular time is unloaded sequentially without unloading intervening information parallelly loaded at another time. For example, in a computer graphics system the present invention facilitates efficient loading of cache faults from a parallel communication pipeline to a staging memory and sequentially unloading the cache fault information from the staging memory in a manner that maintains appropriate timing dependencies and conserves hardware. In another embodiment of the present invention, information is entered in a staging component in parallel and unloaded parallelly in a manner that ensures information loaded into the staging component at a particular time is unloaded without interruption by intervening information parallelly loaded at another time.

Figure 3:
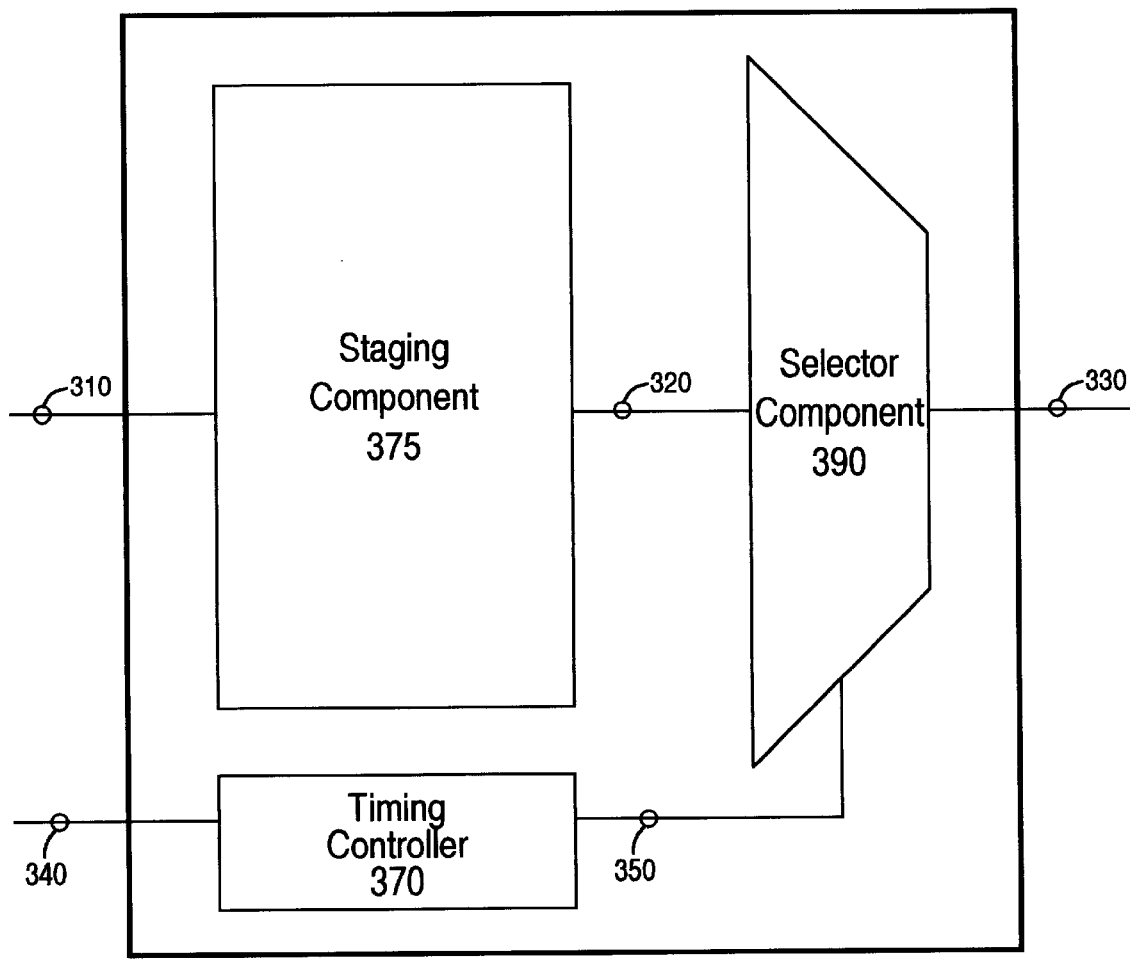
FIG. 3 is a block diagram illustration of one embodiment of a time dependency maintenance system and method.

FIG. 3 illustrates one embodiment of time dependency maintenance system and method 300. Time dependency maintenance system and method 300 comprises staging information input bus 310, staging component 375, internal information bus 320, selector component 390, timing input bus 340, timing controller 370, selection input bus 350 and information output bus 330. Staging component 375 is coupled to staging information input bus 310 and internal information bus 320. Timing controller 370 is coupled to timing input bus 340, selection input bus 350 and information output bus 330. Selector component 390 is coupled to internal information bus 320, selection input bus 350 and information output bus 330.

Staging information input bus 310, internal information bus 320, timing input bus 340, selection input bus 350 and information output bus 330 are communication buses that comprise single or multiple communication lines. For example, in one embodiment staging information input bus 310 comprises eight lines and information output bus 330 comprises a single line. In another embodiment staging information input bus 310 comprises eight lines and information output bus 330 comprises four lines. Staging component 375 receives information for storage or processing. Selector 390 includes a combinational logic component which converts between parallel and sequential operations that include the information loaded in staging component 375. Timing controller 370 utilizes a tracking label (e.g., a representative bit) to track timing dependencies associated with information transmitted via staging information input bus 310 and ensures the information is communicated and processed in an order that preserves the timing dependencies as the information is converted between parallel and sequential operations.

In one embodiment of time dependency maintenance system and method 300 embodiment timing controller 370 tracks the entry of information into staging component 375 and ensures that information loaded into staging component 375 at a particular time is processed through selector 390 without interruption by information loaded at a different time. The present invention utilizes a tracking label (e.g., a representative bit) to permit relatively small amounts of hardware to track such timing dependencies associated with a larger quantity of information as the larger quantity of information is processed and communicated through relatively large hardware equipment. It should be appreciated that staging component 375 includes a variety of configurations in different embodiments of the present invention, including a memory configuration, a processor configuration or a communication device configuration.

Figure 4:
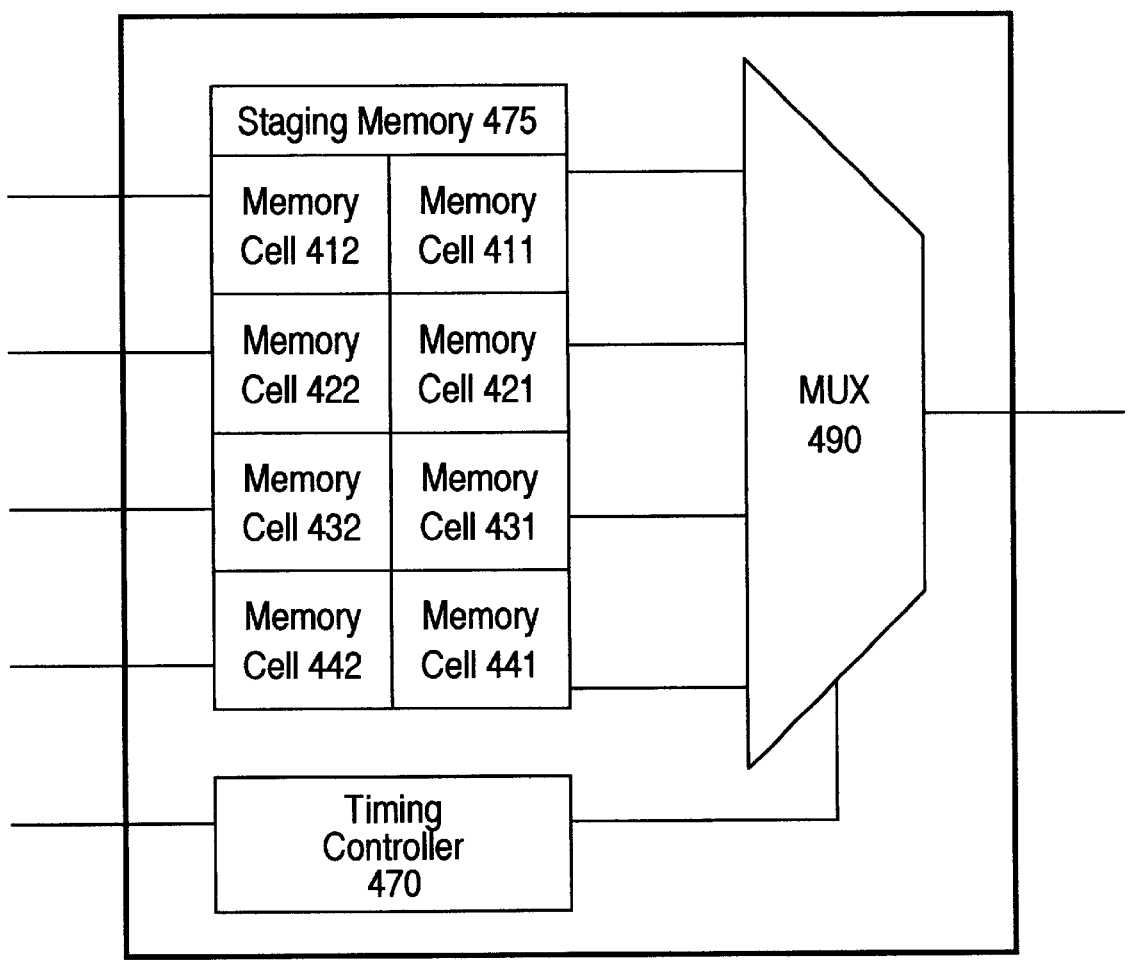
FIG. 4 is another block diagram illustration of a time dependency maintenance system and method, one embodiment of the present invention.

In one embodiment of the present invention staging component 375 includes a staging memory 475 and selector 390 includes a multiplexer (MUX) 490. FIG. 4 is a block diagram illustration of time dependency maintenance system and method 400, an embodiment that includes staging memory 475 and MUX 490. Timing controller 470 ensures that the information loaded into staging memory 475 at multiple times comes out of MUX 490 without information overlapping between time periods. For example, timing controller 470 issues select signals to MUX 490 that cause the information in staging memory 475 to empty sequentially, ensuring information parallelly loaded at a particular time in staging memory 475 is unloaded before information loaded in staging memory 475 at a later time. In this example, time dependency maintenance system and method 400 ensures that parallel time dependencies are maintained on a first in first out (FIFO) basis between information parallelly loaded at one time period and information parallelly loaded at another time period. In other embodiments timing controller 470 maintains timing dependencies on other basis such as last in first-out (LIFO), etc.

In one embodiment, staging memory 475 comprises two columns of memory cells, a first column including memory cells 411 through 441 and a second column including cells 412 through 442. In one example of a parallel load operation of staging memory 475, a logical 1 is entered in memory cells 411 and 431 and a logical 0 is entered in memory cells 421 and 441 at a particular time. Then in a second parallel load of staging memory 475 at some other time, a logical 0 is entered in memory cells 412 and 432 and a logical 1 is entered in memory cells 422 and 442. The logical bits loaded in memory cells 411 through 441 are unloaded sequentially (e.g., 1010) before logical bits in memory cells 421 through 424 (e.g., 0101), even if logical bits in memory cells 412 through 442 are shifted into memory cells 411 through 414 after the original bits (e.g. 1010) are unloaded. For example, the logical 1 loaded in memory cell 411 is unloaded first and the logical 0 in memory cell 412 is "later" loaded or "shifted" into memory cell 411. The logical bits 010 in memory cells 421 through 441 are unloaded before the logical 0 bit "later shifted" into memory cell 411.

In one embodiment of the present invention, staging memory 475 and timing controller 470 comprise a FIFO memory system. A counter or tracking component in the FIFO is utilized to track the information as it is loaded in staging memory 475 and to generate the selection signals for MUX 490. In one embodiment, staging memory 475 includes 8 memory cells number 1 through 8 (000 through 111 in binary). For example, information is loaded in cell number 2(010 in binary) and the FIFO memory counter utilizes the binary 010 to track the memory cell and issue select signals to MUX 490.

Timing controller 470 includes a dependency memory in one embodiment of the present invention. Timing controller 470 tracks the order in which information is loaded in staging 475 memory and ensures that the information loaded into staging memory 475 at a particular time is processed through selector 490 without interruption by the information loaded at a different time. In one embodiment the information is loaded in staging memory 475 in parallel and timing controller 470 issues signals to the combinational logic in selector 490. The signals issued by timing controller 470 cause the information in staging memory 475 to sequentially empty the information parallelly loaded at a particular time in staging memory 475 without interruption by information parallelly loaded in staging memory 475 at a different time. In one embodiment of staging memory 475, memory cells 411 through 442 include 24 bit words and dependency memory cells in timing controller 470 are 2 bits wide. In this example the 2 bit dependency memory cells are utilized as "place" holders for the 24 bit words to track their order or "place" in the processing sequence. Utilizing the 2 bit "place" holders effectively conserve memory resources instead of having the 24 bit words also act as their own "place" holders in a sequence queue.

Figure 5:
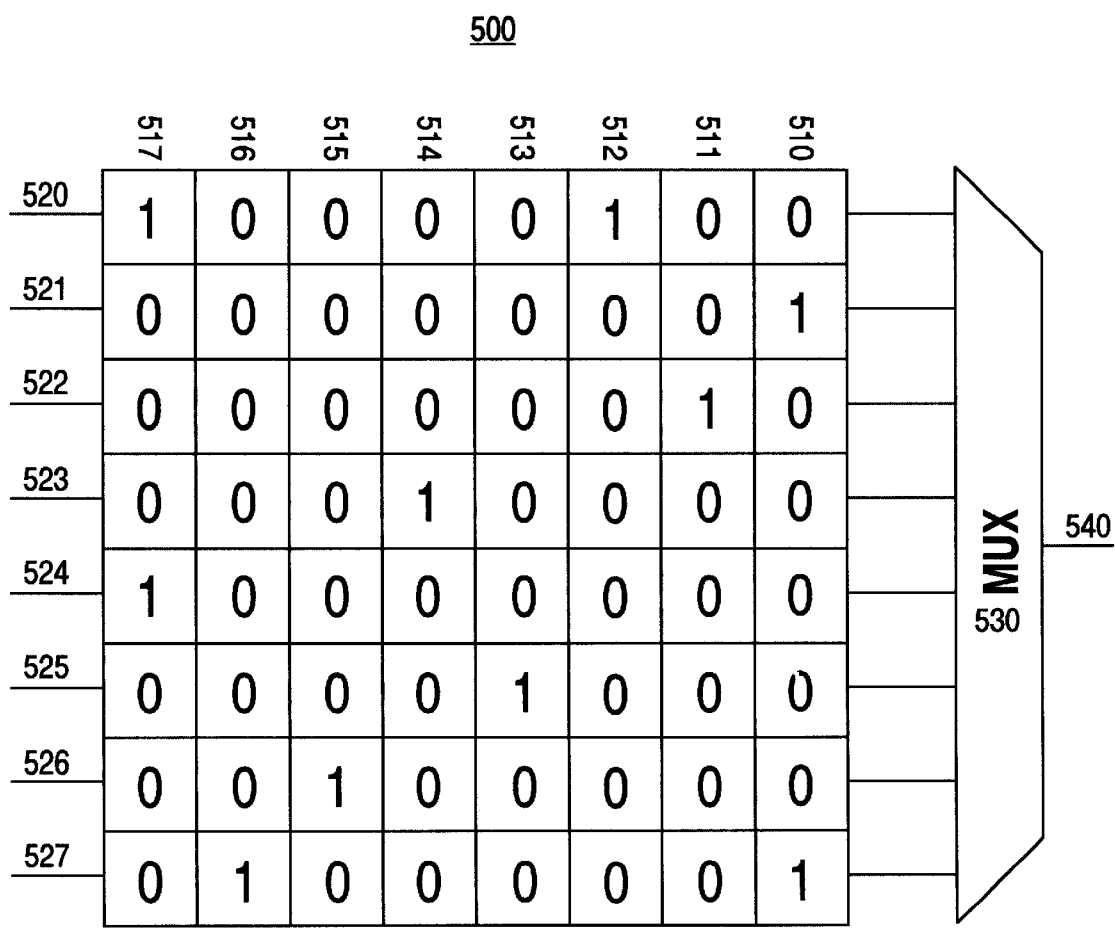
FIG. 5 is a block diagram illustrating a representation of a staging memory, one embodiment of the present invention.

FIG. 5 is a block diagram illustrating a representation of staging memory 500, one embodiment of the present invention. Staging memory 500 is coupled to MUX 530. Staging memory 500 comprises columns 510 through 517 and rows 520 through 527. Each intersection of a row and column represents a memory cell in staging memory 500. The memory cells are a variety of sizes in different embodiments. In FIG. 5, one representative bit is shown for each memory location for ease of discussion. In one example of information stored in staging memory 500, a memory cell with a logical 1 representative bit indicates information stored in the memory cell is to be communicated by the present invention out of MUX 530 on output line 540.

In one embodiment of staging memory 500 information is loaded in parallel on rows 520 through 527 and cells with a logical 1 representative bit are unloaded on output line 540 in a sequential manner that ensures logical one representative bits parallelly loaded at a particular time via rows 520 through 527 is unloaded sequentially without intervening information parallelly loaded at another time. For example, information stored in memory cells in column 510 rows 520 through 527 is parallelly loaded in memory 500 at the same time and information in the other columns is loaded at a later time. Information in cells 510/521 and 510/527 is unloaded through MUX 530 on output line 540 before information from other columns 511 through 517. Information in memory cell 511/522 is unloaded on output line 540 next followed by information at memory cell 512/520, which is unloaded before any of the information in columns 513 through 517.

Figure 6A:
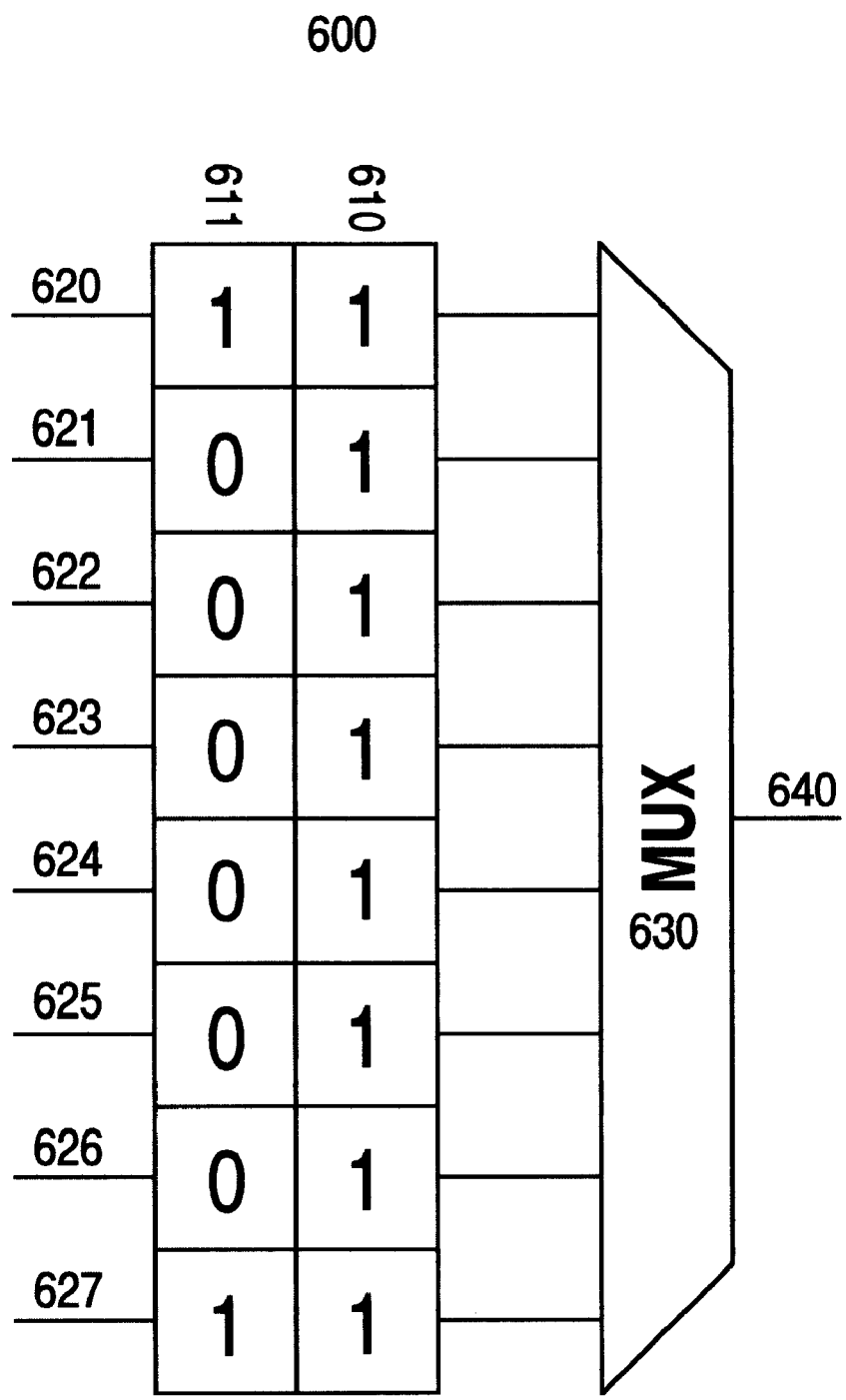
FIG. 6A is a block diagram showing another representation of a staging memory.

While staging memory 500 maintains time dependencies it is sparsely populated with valid data. An alternative embodiment of the present invention is shown in FIG. 6A, a block diagram illustrating a representation of staging memory 600. Staging memory 600 is densely populated with information while time dependencies associated with the information are managed separately in a relatively smaller dependency memory represented by matrix table 680 shown in FIG. 6B. Staging memory 600 is coupled to MUX 630. Staging memory 600 comprises columns 610 through 611 and rows 620 through 627. Each intersection of a row and column represents a memory cell in staging memory 600. In this example of information stored in staging memory 600, memory cells with a logical 1 representative bit indicates information stored in the memory cell is to be communicated by the present invention out of MUX 630 on output line 640. Information is transmitted to memory 600 in parallel bursts and information with a logical 1 representative bit is loaded in memory cells of staging memory 600. Staging memory 600 provides a system and method to store relevant information (e.g. memory cells that include a logical 1 representative bit) and disregards irrelevant information.

The information stored in staging memory 600 in the example depicted in FIG. 6A is the same as the relevant information (e.g., logical 1 representative bits) depicted in FIG. 5. Since the information in staging memory 500 represented by a logical 0 is not transmitted through MUX 540 it is not relevant memory 600 stores information including a logical 1 representative bit and disregards information including a logical 0 representative bit, thereby conserving memory space. The information including a logical 1 representative bit is then unloaded on output line 640 in a sequential manner that ensures information parallelly loaded at a particular time in rows 620 through 627 is unloaded sequentially without intervening information parallelly loaded at another time.

Figure 6B:
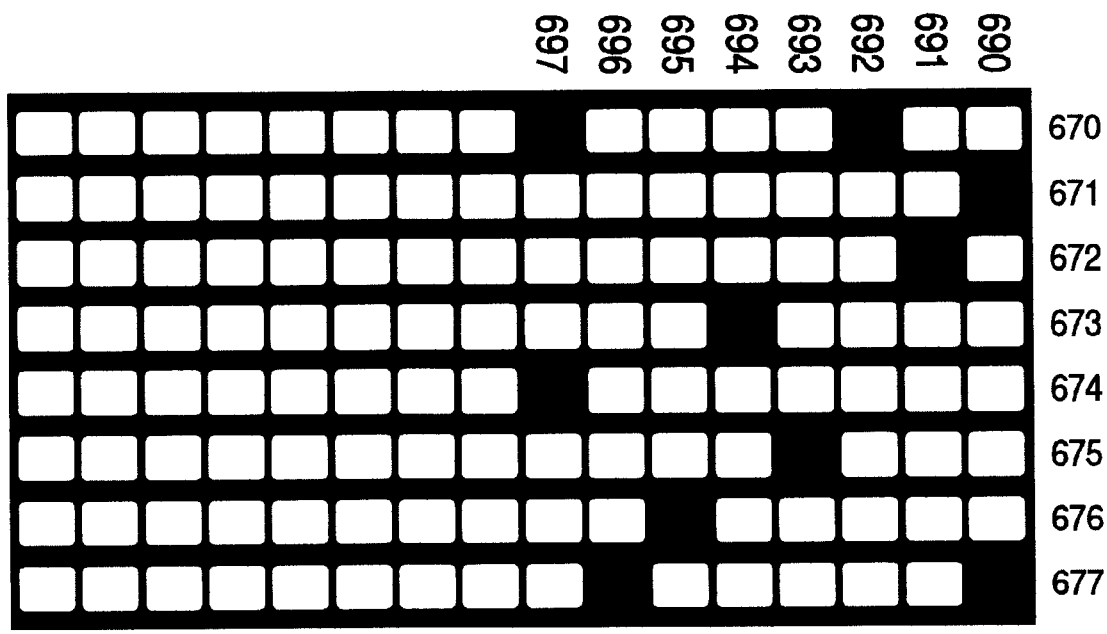
FIG. 6B is a matrix table representing "location" and timing of information stored in a memory.

FIG. 6B is a matrix table 680 representing "location" and timing of information stored in memory 600. matrix table 680 comprises columns 690 through 697 and rows 670 through 677. Each column 690 through 697 represents a particular point in time and darkened cubicles in rows 670 through 677 portray logical 1 representative bits stored in rows 620 through 627. Information is parallelly transmitted to memory 600 and information including a logical one representative bit is loaded in a memory cell. In this example, at time 690 information is parallelly transmitted to memory 600 and information with a logical 1 representative bit in column 690 rows 671 and 677 being stored in column 610 rows 621 and 627. For example, at time 691 information is parallelly transmitted to memory 600 and information with a logical 1 representative bit in column 691 row 672 being stored in column 610 row 622. At time 692 information is parallelly transmitted to memory 600 and information including a logical 1 representative bit in column 692 row 670 being stored in column 610 row 620.

In one embodiment of the present invention, staging memory 600 is a FIFO memory that stores logical 1 representative bit information similar to staging memory 500 in FIG. 5, except staging memory 600 is utilizing much less memory hardware. The information that includes a logical 1 representative bit is loaded in staging memory 600 by filling up available memory cells in column 610 first and then and column 611 next. For example, at time 696 information is parallelly transmitted to memory 600 with information in column 696 row 677 being stored in column 611 row 627. The information parallelly transmitted at time 697 is an illustration of a situation in which the information is stored in different columns of memory cells in memory 600 filling up the right most available memory cell in each respective row first. At time 697 information is parallelly transmitted to memory 600 with information in column 697 row 670 being stored in column 611 row 620 and information in column 697 row 674 being stored in column 610 row 624.

In one embodiment of the present invention information stored in staging memory 600 is moved to another position within staging memory 600 to equalize usage. In one embodiment of staging memory 600 that maintains a FIFO timing dependency on a top/down basis in any given column, if row 620 is full of information that includes logical 1 representative bits as shown in FIG. 6A, information in a memory cell of row 620 is moved to another row and appropriate adjustments are made in the timing controller. For example, if rows 625 to 627 did not include information comprising a logical 1 representative bit, the information in row 611/620 that includes a logical 1 representative bit is moved to a memory cell in column 610 rows 625 though 627 that has not been utilized as frequently, thereby equalizing usage. In another example a logical 1 bit (not shown) arrives for inclusion in row 620, while row 620 is fully occupied, the newly arriving logical 1 bit is moved down to input line 621 to be inserted in memory cell 611/621. In yet another embodiment of the present invention the information is "handed off" or "shifted" to a neighboring memory cell and appropriate adjustments are made in the timing controller.

The present invention is included in a computer graphics system in one embodiment. The computer graphics system comprises a raster engine, a texture engine that includes a texture chiplet, transform engine for matrix operations and a front end for communicating with a host processor. The texture chiplet includes a cache memory (referred to as a cache) coupled to a cache memory controller. The cache memory stores information associated with texels. The cache memory controller keeps track of information stored in the cache memory, indicates if information is available in the cache memory in response to a request for the information, and controls when to load new information or remove old information in the cache memory.

Figure 7:
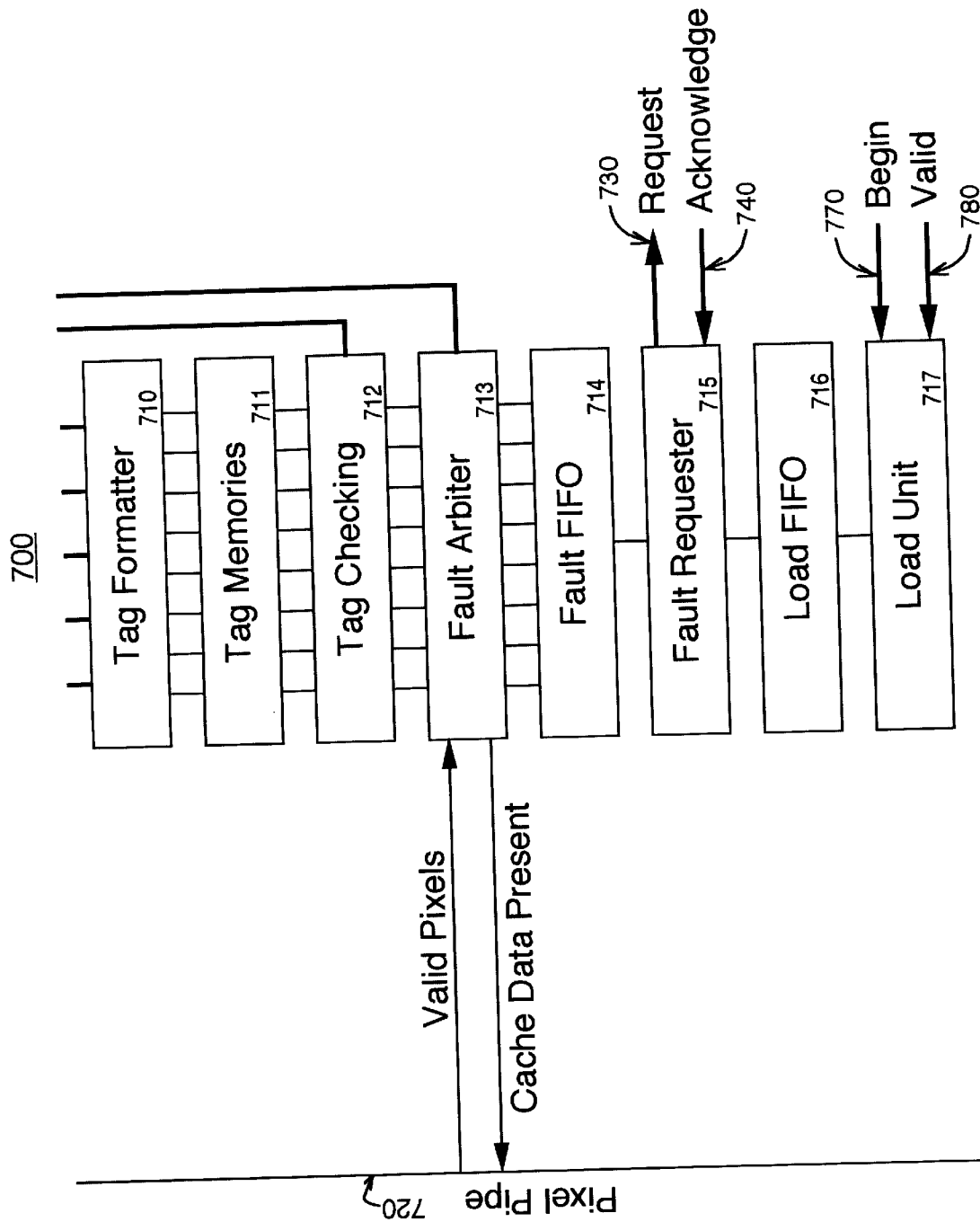
FIG. 7 is an illustration of one embodiment of a cache memory controller of the present invention.

FIG. 7 is an illustration of one embodiment of a cache memory controller 700. Cache memory controller 700 comprises tag formatter 710, tag memory 711, tag checking component 712, fault arbiter 713, fault FIFO component 714, fault requester 715, load FIFO component 716, load unit component 717 and pixel pipe 720. Tag memory 711 is coupled to tag formatter 710 and tag checking component 712 which is coupled to fault arbiter 713. Fault arbiter 713 is coupled to pixel pipe 720. Fault FIFO component 714 is coupled to fault arbiter 713 and fault requester 715 which is coupled to load FIFO component 716. Load unit component 717 is coupled to load FIFO component 716.

The components of cache memory controller 700 operate to track and manage information loaded in a cache. Tag formatter 710 formats a request for information into a tag. Tag memory 711 stores the tags currently assigned to cells in the cache. Tag checking component 712 compares one or more present tags against one or more tags in tag memory 711 to determine if the present tags are already stored in tag memory 711. If the present tags are all included in tag memory 711, fault arbiter 713 signals pixel pipe 720 to retrieve the requested information from the cache. If one or more of the present tags are not included in tag memory 711, fault arbiter 713 determines if retrieving the information from another location and loading the information into the cache at the present time would create unacceptable or locking data dependencies. If retrieving the information from a location and loading it into the cache at the present time would not create data dependencies that are locking, the requested tags and a fault indication in the form of a valid bit is forwarded in parallel to fault FIFO component 714.

In the present embodiment, cache memory controller 700 is utilized to control a cache storing graphics related information such as texture mapping information in a texture chiplet. In this embodiment each pixel is modified ("textured") by up to eight texels and information associated with each texel for a particular pixel is transmitted in parallel to fault FIFO component 714 at the same time. Fault FIFO component 714 includes a graphics parallel and sequential time dependency maintenance system, one embodiment of the present invention. Fault FIFO component 714 receives the texel information in parallel and utilizes the present invention to transmit relevant fault information in a manner that prevents a fault associated with one parallel transmission (e.g., texture information associated with a particular pixel) received by fault FIFO 714 from being processed before faults of other parallel transmissions (e.g., texture information associated with other pixels) received later by fault FIFO 714. Thus faults from parallel groups of information are processed sequentially, with faults from any particular parallel transmission received by fault FIFO component 714 not being processed through fault FIFO component 714 before faults from previous parallel transmissions received by fault FIFO component 714. Thus, a FIFO sequential processing and communication of cache faults with respect to the inputs and outputs of fault requester 714 is maintained and texture information associated with a particular pixel is not mixed with texture information associated with another pixel.

Figure 8:
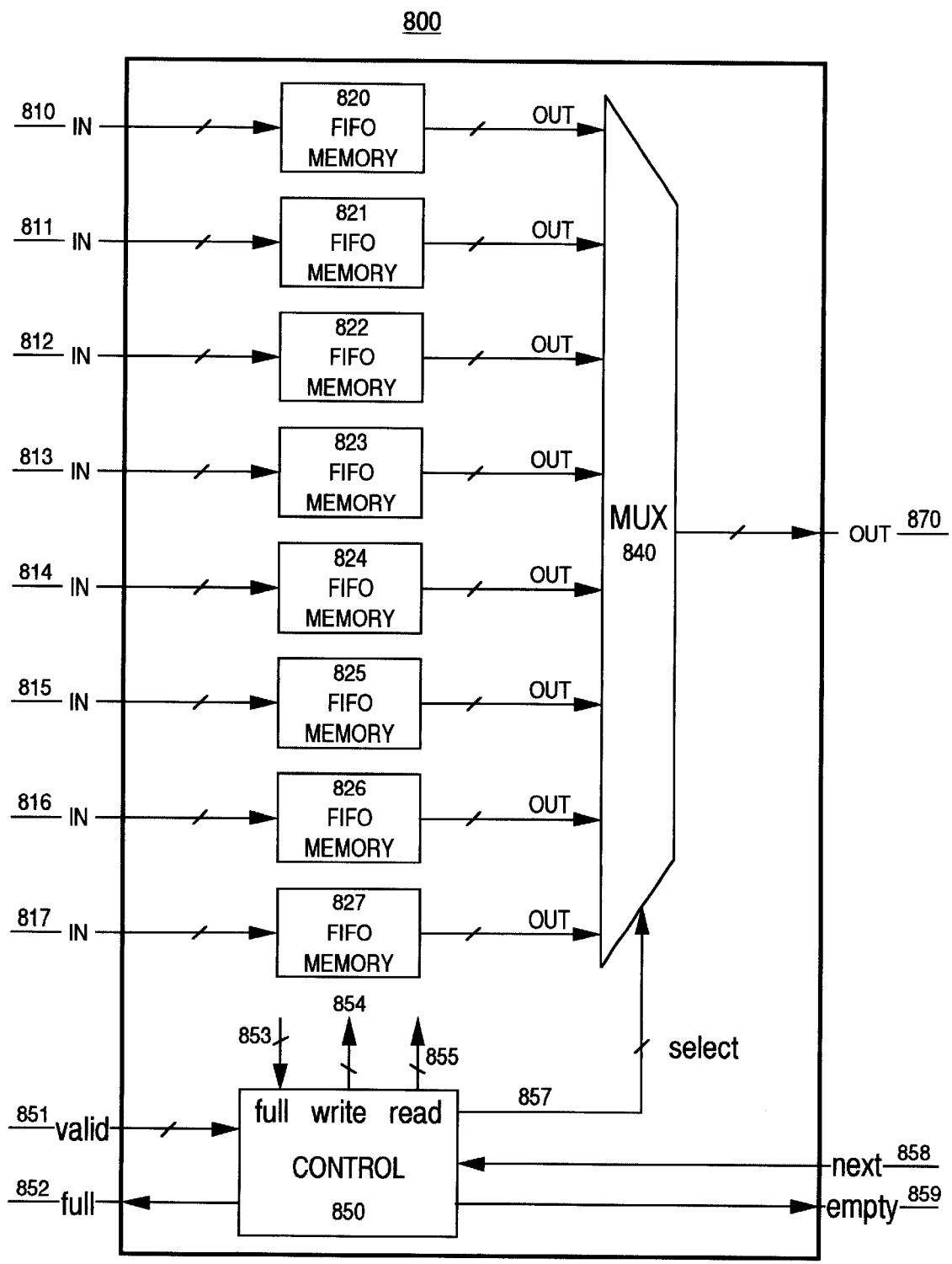
FIG. 8 is a block diagram of a fault FIFO component, one embodiment of the present invention.

FIG. 8 is a block diagram of fault FIFO component 800 one embodiment of fault FIFO component 714. Fault FIFO component 800 comprises input bus 810 through 817, staging FIFO memories 820 through 827, FIFO output buses 830 through 837, MUX 840, output bus 870, timing controller 850, valid input bus 851, full output bus 852, full input bus 853, write bus 854, read bus 855, select bus 857, next bus 858 and empty bus 859. Input bus 810 through 817, FIFO output bus 830 through 837, and output bus 870 each comprise 56 signal lines and valid input bus 851, full input bus 853, write bus 854, read bus 855 each comprise 8 signal lines. Select bus 857 includes 3 signal lines. Staging FIFO memories 820 through 827, are coupled to input buses 810 through 817 respectively and FIFO output buses 830 through 837 respectively which are coupled to MUX 840. MUX 840 is coupled to output bus 870 and timing controller 850. Timing controller 850 is coupled to valid input bus 851, full output bus 852, full input bus 853, write bus 854, read bus 855, select bus 857, next bus 858 and empty bus 859.

Fault FIFO component 800 receives parallel communication of information and sequentially transmits the information in a manner that ensures timing dependencies are maintained. Input buses 810 through 817 transmit 56 bit tags to each of the staging FIFO memories 820 through 827 respectively. Staging FIFO memories 820 through 827 store the tags. In this embodiment staging FIFO memories 820 through 827 include memory cells that are 56 bits wide configured in a 2 by 8 array similar to staging memory 600 in FIG. 6A. FIFO output buses 830 through 837 transmit 56 bit tags to MUX 840. MUX 840 processes the tags transmitted on FIFO output buses 830 through 837 and transmits them on output bus 870. The order in which the tags are processed by MUX 840 is determined by the select signals transmitted to MUX 840 from timing controller 850 on select bus 857. Timing controller 850 initiates select signals in a manner that ensures the information received on input buses 810 through 817 at any given time is communicated through MUX 840 and out onto output bus 870 sequentially, without interrupting transmission of information received at another time. Valid input bus 851 transmits representative bits which are also transmitted on write bus 854. Full output bus 852 and full input bus 853 carry a signal that indicates one of the staging FIFO memories 820 to 827 is full and empty bus 859 carries a signal that it is empty. Read bus 855 conveys signals that indicates when to read the information in a memory cell from one of the staging FIFO memories 820 through 827. Next bus 858 transmits a signal indicating the next group of information (e.g., the next tag) is to be processed.

Figure 9:
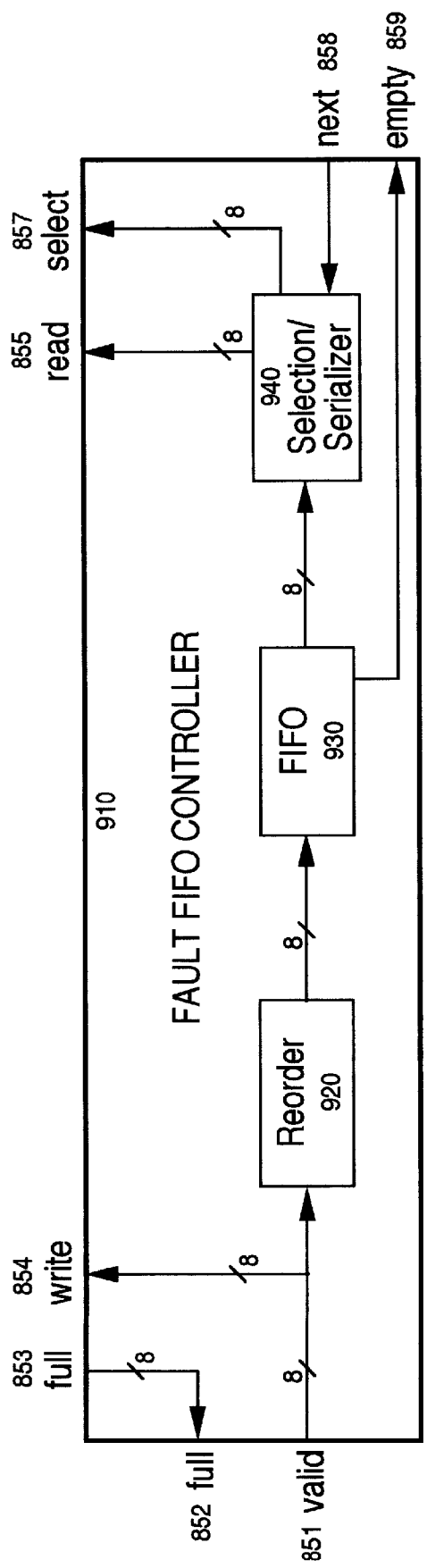
FIG. 9 is a schematic showing one embodiment of a timing controller of the present invention.

FIG. 9 is a schematic of timing controller 910, one embodiment of timing controller 850. Timing controller 910 comprises reordering component 920, dependency memory 930, and selection serializer 940. Dependency memory 930 is coupled to reordering component 920, selection serializer 940 and empty bus 859. Reordering component 920 is coupled to valid input bus 851 and write bus 854. Dependency memory 930 stores representative bits and tracks the arrival of information in the staging memory. In one embodiment dependency memory 930 is a 16 by 8 flip flop memory array in this example including 16 columns and 8 rows of memory cells which comprise 1 bit each. Selection serializer 1000 is one embodiment of a selection serialization component which generates selection signals for MUX 840 in an appropriate sequential order. Selection serializer 1000 transmits appropriate selection signals to combinational logic (e.g., MUX 840) in manner that ensures information loaded in an adjacent order is unloaded in a manner that maintains the relative adjacency of information. Reordering component 930 realigns input tracking information in a manner that permits selection signals to be configured in a manner that takes advantage of the inherent timing delays in combinational logic (e.g., MUX 840) to gain high performance.

Figure 14:
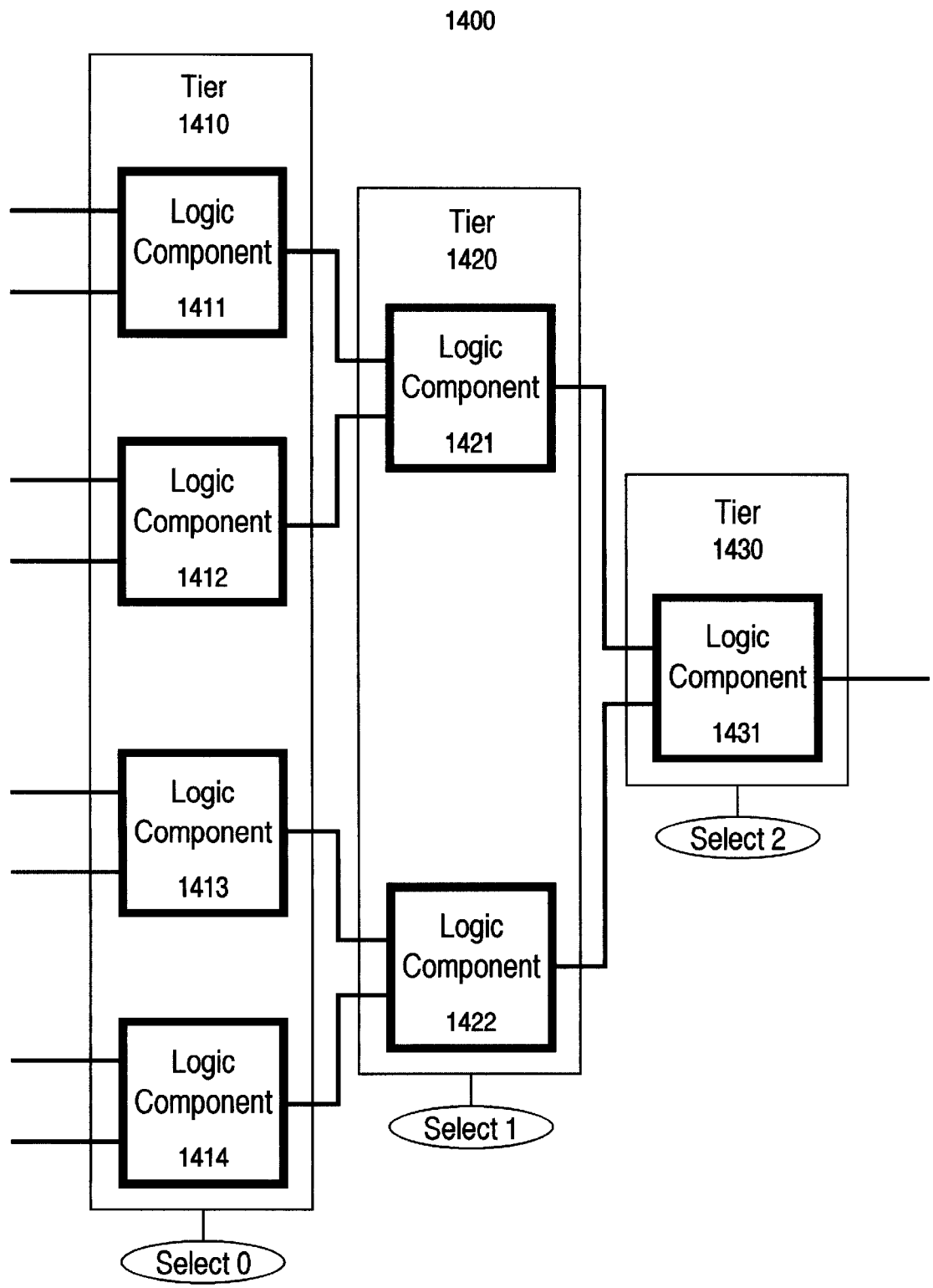
FIG. 14 is a illustration of one embodiment of a MUX.

In one embodiment, reorder component 920 and selection serializer 1000 reorder tracking bits to generate selection signals in a manner that optimizes performance by taking advantage of intrinsic design characteristics of combinational logic (e.g., MUX 840). MUX 840 is configured in tiers of combinational logic that a bit is propagated through. FIG. 14 is an illustration of one embodiment of MUX 840. In this embodiment MUX 840 comprises logic components 1411 through 1414 in tier 1410, logic components 1421 and 1422 in tier 1420 and logic component 1431 in tier 1430. Tier 1410 is controlled by a select bit 0, tier 1420 is controlled by a select bit 1 and tier 1430 is controlled by a select bit 2. It takes time for a bit to propagate from an input to tier 1410 to the output of tier 1430. Thus, select bit 02 does not need to be driven at the same time as select bit 0 and the present invention takes advantage of this inherent MUX characteristic to improve performance.

Figure 10:
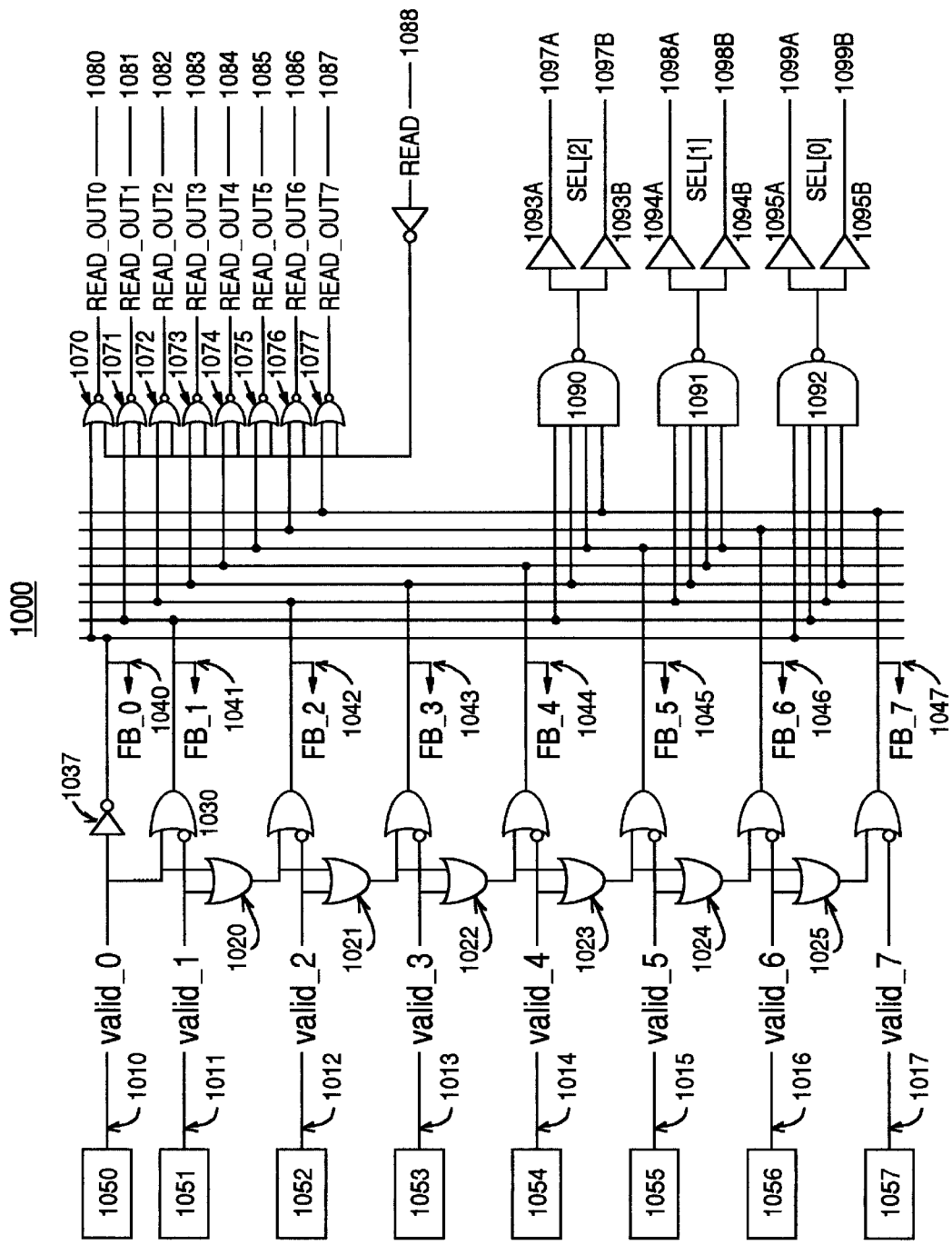
FIG. 10 is a schematic of a fault FIFO selection serializer included in one embodiment of the present invention.

FIG. 10 is a schematic of fault FIFO selection serializer 1000, one embodiment of selection serializer 940. Fault FIFO serializer control 1000 comprises valid input lines 1010 through 1017, sequential maintaining logic components (e.g., in this embodiment OR gates) 1020 through 1025, inverting OR gates 1030 through 1036, inverter 1037, feedback lines 1040 through 1047, readout logic components (e.g., in this embodiment NOR gates) 1070 through 1077, read out lines 1080 through 1087, a peripheral memory ready indication signal line including read inverter 1088, select logic component (e.g., in this embodiment NAND gates) 1090 through 1092, drivers 1093A through 1095B and select lines 1097A through 1099B. The logic gates utilized and their configuration varies in some embodiments of the present embodiment.

Valid input line 1010 through 1016 are respectively coupled to inverting OR gates 1030 through 1036, and flip flops 1050 through 1057 (which are included in dependency memory 930 in one embodiment of the present invention). Valid input line 1010 is coupled to inverter 1037. Valid input line 1010 is coupled to sequential maintaining OR gate 1020 and valid input line 1011 through 1016 are coupled to sequential maintaining OR gates 1020 through 1025. Inverting OR gates 1030 through 1036 are coupled to sequential maintaining OR gates 1020 through 1025 and feedback lines 1041 through 1047, respectively. Inverter 1037 is coupled to feedback line 1040. Sequential maintaining OR gate 1021 is coupled to sequential maintaining OR gate 1020 and sequential maintaining OR gate 1022 which is coupled to sequential maintaining OR gate 1023. Sequential maintaining OR gate 1024 is coupled to sequential maintaining OR gate 1023 and sequential maintaining OR gate 1025. Readout NOR gates 1070 through 1077 are coupled to feedback lines 1040 through 1047 and read out lines 1080 through 108, respectively. Read inverter 1088 is coupled to readout NOR gates 1070 through 1077. NAND gate 1090 is coupled to driver 1093A, driver 1093B, and inverting OR gates 1030, 1032, 1034 and 1036. NAND gate 1091 is coupled to driver 1094A, driver 1094B, and inverting OR gates 1031, 1032, 1033 and 1034. NAND gate 1092 is coupled to driver 1095A, driver 1095B, inverter 1037, and inverting OR gates 1030, 1031, 1032, and 1033. Drivers 93A through 95B are coupled to select lines 97A through 99B, which are coupled to MUX 840. Input lines y10 through y17 transmit valid signals valid_0 through valid_7 respectively, feedback lines 1040 through 1047 transmit feedback signals FB_0 through FB_7 respectively, read output lines 1080 through 10 87 transmit readout signals read_out0 through read_out7.

The components of fault FIFO selection serializer 1000 operate to select information stored in FIFO memories 820 through 825 for transmission through MUX 840 to output bus 870 in a sequential manner that maintains appropriate timing dependencies. The peripheral memory ready indication signal line transmits a signal indicating a peripheral memory is ready for a next transaction. Valid input lines 1010 through 1017 communicate representative bits. Inverter 37 and inverting OR gates 1030 through 1036 transmit an output signal that is used for feedback signals FB_0 through FB_7 and as inputs to readout NOR 1070 through 1077, ensuring logical 1 valid signals are processed. The sequential maintaining logic components transmit a sequence maintaining signal to the readout logic component. Sequential maintaining OR gates 1020 through 1025 ensure that valid_0 through valid_7 signals which are a logical 1 impact read_out0 through read_out7 signals in a sequential order respectively. Readout logic components (e.g., readout NOR gates 1070 through 1077) coordinating readout signals with a signal indicating a peripheral memory is ready for a next transaction.

In the present embodiment illustrated in FIG. 10 readout NOR gates 1070 through 1077 issue a logical 0 for read_out0 through read_out7 signals when corresponding valid_0 through Valid_7 signals are a logical 1 and the output of read inverter y88 is a logical 0. Read inverter y88 changes a logical 1 signal from a memory indicating that a prior read request has been processed into a logical 0. Select logic components for generate select signals for the combinational logic (e.g. MUX 840 )in a manner that ensures timing dependencies are preserved. In the embodiment shown in FIG. 10, NAND gates 1090 through 1092 are configured to generate select signals for MUX 840 in a manner that minimizes power requirements by taking advantage of some inherent configuration characteristics of MUX 840. Drivers 1093A through 1095B boost the power of the select signals so they are sufficient to operate MUX 840.

Information that includes a logical 1 representative bit is transmitted through fault FIFO selection serializer 1000. If a valid signal is a logical 1 and a valid signal higher in the sequential order of valid signals is not a logical 1, a logical 0 is transmitted to an input of a respective NOR gate 1070 through 1077 and to a respective input of NAND gates 1090 through 1092. Transmitting a logical 0 to the respective inputs of NOR gate 1070 through 1077 and NAND gates 1090 through 1092 ensures the outputs of NOR gate 1070 through 1077 and NAND gates 1090 through 1092 are configured to cause information stored in the corresponding FIFO memories 820 through 825 to be transmitted through MUX 840 to output bus 870 in a sequential manner that maintains appropriate timing dependencies. If a valid signal is a logical 1 and a valid signal higher in the sequential order is not a logical 1, a logical 0 is also transmitted as the respective feed back signal FB_0 through FB_7 causing the respective flip flops 1050 through 1057 to reset and respective valid_0 through valid_7 to become a logical 0. In turn, feedback signals FB_0 through FB_7 are transformed to a logical 1 after the respective reset valid_0 through valid_7 signals are applied to inputs of inverter 37 and inverter OR gates 1030 through 1036 respectively. As the valid signals valid_0 through valid_7 are reset to a logical zero they also cause the outputs of sequential maintaining OR gates 1020 through 1025 to change to a logical 0 in a cascading manner that ensures the valid signals valid_0 through valid_7 are processed in a sequential manner.

In one example, the valid bit information associated with information parallelly loaded in fault FIFO component 800 is similar to the information displayed above in FIG. 5. After going through reorder component 920 the bits are parallelly loaded in dependency memory 930 in an order illustrated by matrix table 1100 shown in FIG. 11. The representative logical 1 bits in cubicles 1120 through 1127 correspond to logical 1 representative bits loaded in flip flop 1050 through 1057. In one cycle the logical 1 representative bit in cubicle 1110/1120 corresponds to a logical 1 representative bit loaded in flip flop 1050 and on input line 1010 and the logical 1 in cubicle 1110/1123 corresponds to a logical 1 representative loaded in flip flop 1054 and on input line 1014. The remaining logical zeroes in the cubicles of column 1110 indicate that information is not loaded on inputs lines during the present cycle (e.g., particular time) represented by column 1110.

Referring again to an example operation of fault FIFO selection serializer 1000 shown in FIG. 10, the logical 1 on input line 1010 is applied to an input of sequential maintaining OR gate 1020 and inverting OR gate 1030 thereby ensuring that the outputs of those gates are a logical 1. The logical 1 on the output of sequential maintaining OR gate 1020 is fed into an input of sequential maintaining OR gate 1021 ensuring that the output of sequential maintaining OR gates 1021 is a logical 1. The output of the sequential maintaining OR gates 1021 through 1024 are respectively coupled to the input of the next sequential maintaining OR gates 1022 through 1025, thus a logical 1 applied to the input of a sequential maintaining OR gate 1020 propagates through each of the succeeding sequential maintaining OR gates 1021 through 1025. Since the output of sequential maintaining OR gates 1020 through 1025 are a logical 1, the outputs of inverting OR gates y30 through 1036 are a logical 1. Inverter 37 inverts the logical 1 on input line 1010 and drives a logical 0 to an input of NOR gate 1070 and back to flip flop 1050 via feedback line 40. The logical 0 sent to flip flop y50 resets flip flop y50 and signal valid_0 is set to a logical 0 which in turn is applied to a sequential maintaining OR gate 1020 and inverter 37 which now applies a logical 1 to the input of NOR gate 70. Since inputs from matrix table 1111 for flip flop 1051 and flip flop 1052 signals are a logical 0 in the present cycle the logical 0 output of sequential maintaining OR gate 1020 propagates through sequential maintaining OR gate 1021 to sequential maintaining OR gate 1022.

The logical 1 on input line 1013 is applied to an input of sequential maintaining OR gate 1022, ensuring that the output is a logical 1. The logical 1 propagates through the remaining sequential maintaining OR gates 1023 through 25 thereby ensuring that the outputs of inverting OR gates y33 through y36 are a logical 1. The logical 0 propagated through sequential maintaining OR gate 1020 and 1021 and the logical 1 on input line 1013 are applied to inverting OR gate y32 causing the output of inverting OR gate y32 to change to a logical 0 which is transmitted to NOR gate 1073 and feedback on feedback line 1043 as feedback signal FB_3 which resets flip flop 1053. When flip flop 1053 is reset it causes valid signal valid_3 to change to a logical 0 which results in the output of inverting OR gate 1032 changing to a logical 1.

After information at time 1110 has been processed by fault FIFO selection serializer 1000, information from time 1111 is loaded in flip flops y50 through y57. Inverter y37 and inverting OR gates y30 through y32 invert the logical 0 signals loaded in flip flops y50 through y53 and apply a logical 1 signal to inputs of NOR gates y70 through y73. The logical 1 in cubicle 1111/1124 is shifted into flip flop 54 and onto input line y14. The logical 1 is propagated through sequential maintaining OR gates 1023 through 1025 ensuring a logical 1 is presented to an input of NOR gates 1075 through 1076. The logical 1 valid signal valid_4 is inverted by inverting OR gate 1033 and a logical 0 is applied to NOR gate 1074 and transmitted to flip flop 1054 on feedback line 1044 resetting flip flop 1054 when read 1088 is asserted (connection not shown). Resetting flip flop 1054 causes the output of inverting OR gate 1033 to become a logical 1 which is applied to NOR gate 1074. After the logical 1 representative bit at time 1111 has been processed by fault FIFO selection serializer 1000 the logical 1 representative bits from following times 1112 through 1117 loaded in flip flops 1050 through 1057 are processed through fault FIFO selection serializer 1000 in a sequential manner that maintains timing dependencies.

Figure 12:
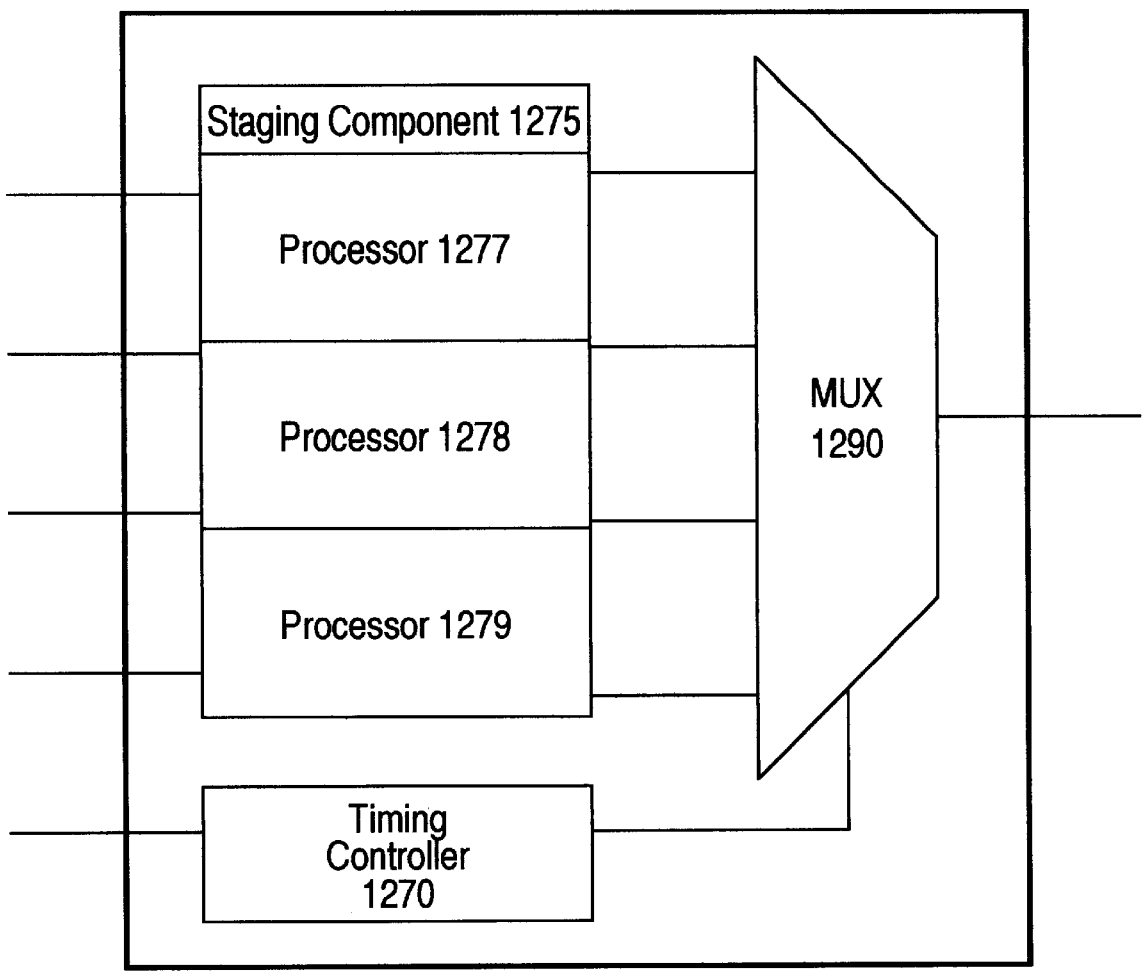
FIG. 12 is a lock diagram illustration of another embodiment of a time dependency maintenance system and method staging component that includes processors.

FIG. 12 is a block diagram illustration of another embodiment of time dependency maintenance system and method 1200 staging component 1275 includes processors. In this embodiment time dependency maintenance system and method 1200 tracks the arrival of information in a number of processors and ensures that information is removed from the processors in an order that maintains timing dependencies. In one of embodiment time dependency maintenance system and method 1200, staging component 1275 includes processors 1277, 1278 and 1279. The present invention again utilizes representative bits in timing controller 1270 to track the arrival of information in the processors of staging component 1275. For example, information to be processed is not necessarily parallelly delivered to each of the processors, processor 1278 may receive information first and then processor 1277 at a later time. The present invention is capable of maintaining that original reception timing dependency even if processor 1277 finishes processing its information first by utilizing a table similar to 1100 to ensure that information is removed from processor 1278 first.

In yet another embodiment time dependency maintenance system and method 1200 staging component 1275 includes communication devices. In a manner similar to the staging memory and processors, the present invention maintains timing dependencies associated with information arriving at the communication devices. Again the present invention relies on representative bits to track the timing dependencies. For example, the communication devices in one embodiment are data compression/decompression devices that compress and decompress data communication streams. One communication device may receive information before another but the second communication device finish a decompression first. However, the present invention is capable of ensuring the second communication stream is not forwarded first if it has a time dependency based upon the first communication stream.

Figure 13:
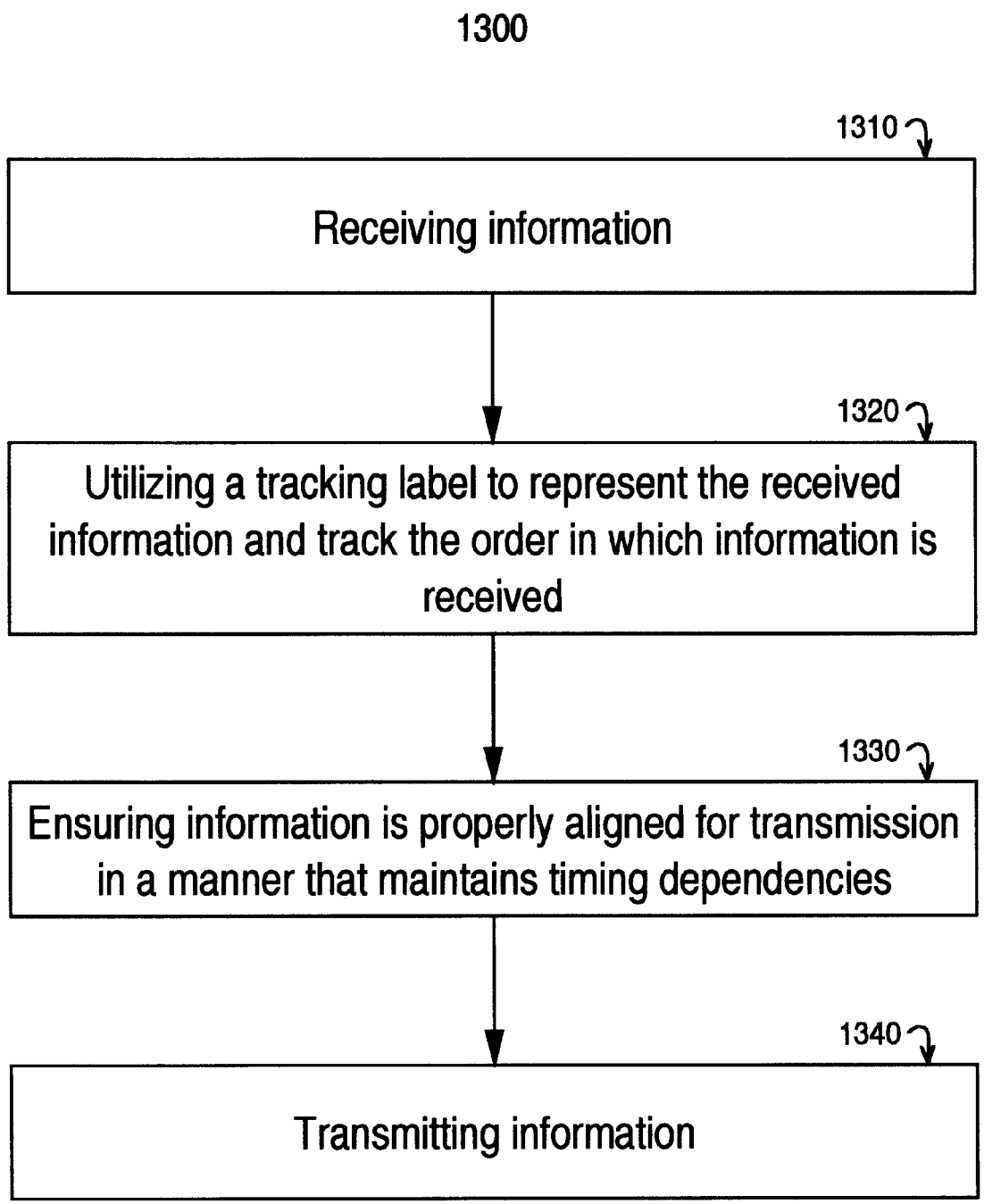
FIG. 13 is a flow chart illustrating a time dependency maintenance method of the present invention.

FIG. 13 is a flow chart illustrating time dependency maintenance method 1300, one embodiment of the present invention. Time dependency maintenance method 1300 maintains timing dependencies during the conversion between serial and parallel operations. In one embodiment of the present invention, the order in which information is transmitted and processed is tracked and dependency maintenance method 1300 ensures that operations are performed on information transmitted and processed at a particular time without interruption by information transmitted and processed at a different time. For example, time dependency maintenance method 1300 tracks the order in which information is parallelly loaded in a staging component and causes the information in to sequentially empty information parallelly loaded at a particular time without interruption by information parallelly loaded at a different time.

In Step 1310 of time dependency maintenance method 1300 information that has timing dependency requirements is received. In one embodiment of time dependency maintenance method 1300 the information is received parallelly. For example, texel information associated with a pixel is received on multiple lines at the same time. In another embodiment information is received serially.

In Step 1320 time dependency maintenance method 1300 utilizes a tracking label (e.g., representative bits) to track timing dependency characteristics associated with the information and the order in which information is received. In one embodiment time dependency maintenance method 1300 stores a tracking label in a dependency memory. For example, the information and the tracking label bits are loaded in a memory in parallel. Then time dependency maintenance method 1300 unloads the information sequentially in an order that preserves timing dependencies as the information is converted between parallel and sequential operations.

Time dependency maintenance method 1300 ensures information is properly aligned for transmission in Step 430 in a manner that maintains said timing dependencies. In one embodiment of the present invention, time dependency maintenance method 1300 notes the order in which information is loaded in a staging component and ensures that information loaded into the staging component at a particular time is processed through combinational logic without interruption by information loaded at a different time. In addition time dependency maintenance method 1300 arranges selection signals for a MUX in a manner that takes advantage of inherent timing characteristics of the MUX to maximize performance.

In Step 1340 time dependency maintenance method 1300 transmits the information in a manner that maintains timing dependencies. In one embodiment of the present invention, time dependency maintenance method 1300, sends a feedback signal to a dependency memory to notify the dependency memory of the processing status of information previously forwarded from the dependency memory. Time dependency maintenance method 1300 ensures that valid signals impact read out signals in a sequential order and forwards a signal to readout logic indicating a readout of information is to occur. Time dependency maintenance method 1300 also issues a read out signal when a corresponding valid signal is asserted and utilizes a signal from a memory indicating that a prior read request has been processed.

Thus the present invention provides time dependency and ordering constraint management in a reliable, cost effective, and extremely efficient manner. The present invention is adaptable to a wide variety of electronic systems and has the ability to satisfy the data processing and communication requirements of diverse components, including time dependency requirements and ordering constraints. For example, the present invention facilitates utilization of combined parallel and sequential graphics processing and communication hardware in an effective and efficient manner to support retrieval of information for a cache memory. A timing controller utilizes a tracking label (e.g., a representative bit) to track timing dependencies associated with the information and ensures the information is communicated and processed in an order that preserves the timing dependencies without interruption by information loaded at a different time.

Although the present invention has been primarily described in terms of conversions between parallel to serial operations it should also be appreciated that the present invention is equally applicable in converting between different levels of parallel operations. In one embodiment of time dependency maintenance system and method 300 staging information input bus 310 comprises 8 parallel communication lines and information output bus 330 comprises 4 parallel communication lines. Again, timing controller tracks the entry of information into staging component 375 and ensures that information loaded into staging component 375 at a particular time is processed through selector 390 without interruption by information loaded at a different time. For example, information loaded in staging memory 375 in a parallel burst over the 8 communication lines of staging information input bus 310 are unloaded in 2 communication bursts over the 4 communication lines of information output bus 310 with out interruption by information from another parallel burst sent over the 8 communication lines of staging information input bus 310 at a different time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A graphics parallel and sequential timing dependency maintenance system comprising:

a staging memory for storing information;

a selector component coupled to said staging memory, said selector component converts between sequential and parallel transmissions of said information; and a timing controller coupled to said selector component, said timing controller tracks timing dependencies associated with said information and ensures said information is communicated and processed in an order that preserves said timing dependencies as said information is converted between sequential and parallel operations;

wherein said timing controller includes:

a dependency memory for storing representative bits and tracking the arrival of information in said staging memory;

a selection serialization component for transmitting appropriate selection signals to a combinations logic in manner that ensures information loaded in an adjacent order is unloaded in a manner that maintains the relative adjacency of information, said selection serialization component coupled to said dependency memory; and a reordering component for realigning input tracking information in a manner that permits said selection signals to be configured in a manner that takes advantage of the inherent timing delays in said selector component to increase performance.

2. The graphics parallel and sequential timing dependency maintenance system of claim 1 in which said timing controller utilizes said representative bits to represent said information and track said timing dependencies associated with said information.

3. The graphics parallel and sequential timing dependency maintenance system of claim 1 in which said information is parallelly loaded in said staging memory and unloaded in a sequence that maintains said timing dependencies such that said information parallelly loaded during one time period is sequentially unloaded without interruption by said information loaded during a different time period.

4. The graphics parallel and sequential timing dependency maintenance system of claim 1 in which said staging memory includes registers arranged in cells and said timing dependencies are maintained on a first in first out (FIFO) basis between information parallelly loaded at one time period and information parallelly loaded at another time period.

5. The graphics parallel and sequential timing dependency maintenance system of claim 1 in which said information is associated with texel information for a particular pixel being retrieved from a cache and a representative bit is associated with a valid bit indicating a fault occurred in an attempt to retrieve said texel information from said cache.

6. The graphics parallel and sequential timing dependency maintenance system of claim 5 in which said texel information is parallelly loaded in said staging memory and said selector component includes a multiplexer (MUX) controlled by selection signals generated by said timing controller, said selection signals ensure said MUX processes said texel information associated with a particular pixel through said MUX in a sequential manner without interruption by texel information associated with another pixel.

7. The graphics parallel and sequential timing dependency maintenance system of claim 1 in which said selection serialization component comprises:

a peripheral memory ready indication signal line for transmitting a signal indicating a peripheral memory is ready for a next transaction;

a readout logic component (OUTPUT NOR GATE) for coordinating readout signals with said signal indicating a peripheral memory is ready for a next transaction, said readout logic component coupled to said peripheral memory ready indication signal line;

a valid input line for communicating a representative bit, said valid input line coupled to said readout logic component;

a sequential maintaining logic component (OR GATE) coupled to said valid input line, said sequential maintaining logic gate for transmitting a sequence maintaining signal to said readout logic component;

a feedback line coupled to said readout logic component, said feedback line for transmitting a feedback signal which is utilized to reset a flip flop storing said representative bit;

a select logic component (NAND gates) coupled to said valid input line, said select logic component for generating select signals for said selector component in a manner that ensures timing dependencies are preserved.

8. A timing dependency maintenance system comprising:

a staging component for receiving information;

a selector component coupled to said staging component, said selector component converts between sequential and parallel operations that include said information; and a timing controller coupled to said selector component, said timing controller utilizes a representative bit to track timing dependencies associated with said information and ensures said information is communicated and processed in an order that preserves said timing dependencies as said information is converted between sequential and parallel operations;

wherein said timing controller includes:

a dependency memory for storing representative bits and tracking the arrival of information in said staging component;

a selection serialization component for transmitting appropriate selection signals to a combinations logic in manner that ensures information loaded in an adjacent order is unloaded in a manner that maintains the relative adjacency of information, said selection serialization component coupled to said dependency memory; and a reordering component for realigning input tracking information in a manner that permits said selection signals to be configured in a manner that takes advantage of the inherent timing delays in said selector component to increase performance.

9. The timing dependency maintenance system of claim 8 in which said timing controller tracks the order in which information is loaded in said staging component and ensures that said information loaded into said staging component at a particular time is processed through said selector component without interruption by said information loaded at a different time.

10. The timing dependency maintenance system of claim 8 in which said staging component includes a staging memory and said timing controller tracks the order in which said information is parallelly loaded in said staging memory and said timing controller issues signals to said selector component that cause said information in said staging memory to sequentially empty said information parallelly loaded at a particular time in said staging memory without interruption by said information parallelly loaded in said staging memory at a different time.

11. The timing dependency maintenance system of claim 10 in which said timing controller tracks the order in which graphics related information is parallelly loaded in said staging component and said timing controller ensures that said parallelly loaded graphics related information is unloaded in a sequential order that preserves timing dependencies.

12. The timing dependency maintenance system of claim 10 in which said timing controller tracks the order in which said information is loaded in said staging memory and ensures that said information loaded in an adjacent order is unloaded in a manner that maintains the relative adjacency of said information.

13. The timing dependency maintenance system of claim 8 in which said staging component includes communication equipment and said timing controller tracks the order in which said information is transmitted through said communication equipment and ensures timing dependencies are maintained.

14. The timing dependency maintenance system of claim 8 in which said staging component includes a processor and said timing controller tracks the order in which said information is processed through said processor and ensures timing dependencies are maintained.

15. A time dependency maintenance method comprising the steps of:
   a) receiving information that has timing dependency requirements;
   b) utilizing a tracking label to track timing dependency characteristics associated with said information and the order in which said information is received;
   c) ensuring said information is aligned for transmission in a manner that maintains said timing dependencies; and
   d) transmitting said information in a manner that maintains said timing dependencies;
   wherein step b further comprises the steps of:
      loading said information and said tracking label in parallel; and
      unloading said information sequentially in an order that preserves timing dependencies as said information is converted between parallel and sequential operations;
   and wherein step d further comprises the steps of:
      sending a feedback signal to a dependency memory to notify said dependency memory of the processing status of information previously forwarded from the dependency memory;
      forwarding a signal to a readout logic indicating a readout of information is to occur; and
      ensuring that valid signals impact read out signals in a sequential order.

16. The time dependency maintenance method of claim 15 in which step b further comprises the step of storing said tracking label in said dependency memory.

17. The time dependency maintenance method of claim 15 in which step c further comprises the steps of:
   noting the order in which information is loaded in a staging component; and
   ensuring that said information loaded into said staging component at a particular time is processed through a combinational logic without interruption by said information loaded at a different time.

18. The time dependency maintenance method of claim 15 in which step c further comprises the step of arranging selection signals for a MUX in a manner that takes advantage of inherent timing characteristics of said MUX to optimize performance.

19. The time dependency maintenance method of claim 15 in which step d further comprises the steps of:
   issuing a read out signal when a corresponding valid signal is asserted; and
   utilizing a signal from a memory indicating that a prior read request has been processed.

* * * * *